United States Patent Office 2,957,890
Patented Oct. 25, 1960

2,957,890
PROCESS OF PREPARING PREGNENE COMPOUNDS HAVING AT LEAST ONE DOUBLE BOND AND ONE BROMINE ATOM IN THEIR MOLECULE AND PRODUCTS OBTAINED

Robert Joly, Montmorency, and Julien Warnant, Neuilly-sur-Seine, France, assignors to Les Laboratoires Français de Chimiotherapie, Paris, France, a body corporate of France No Drawing. Filed Dec. 10, 1956, Ser. No. 627,134
Claims priority, application France May 28, 1956
11 Claims. (Cl. 260—397.3)

This invention relates to the preparation of unsaturated bromo-ketosteroids.

The co-pending application Serial No. 627,113 of December 10, 1956, entitled "Method of Preparing Unsaturated Ketosteroids," now Patent No. 2,923,721, describes and claims the preparation of unsaturated ketosteroids, and more particularly the preparation of 1,4-diene ketosteroids, by means of double dehydrohalogenation of the corresponding 2,4-dihalogenated derivatives according to the following reaction scheme:

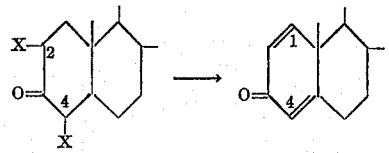

wherein X represents halogen. According to this co-pending application, dehydrohalogenation is accomplished by reacting these 2,4-dihalogenated derivatives with lithium carbonate in a disubstituted carboxylic acid amide, such as dimethylformamide, as the reaction medium. The reaction results in the formation of lithium halide while simultaneously a dehydrohalogenation at the 1,4-position takes place without formation of any 4,6-diene. Since, notwithstanding any excess of lithium carbonate, the reaction is rather slow at the start although later it proceeds more rapidly, an improved manner of carrying out this process consists in reacting these 2,4-dihalogenated derivatives with a previously formed lithium carbonate-lithium halide couple, whereby the reaction is greatly accelerated.

Now we have discovered that, when using lithium carbonate or a lithium carbonate-lithium halide couple of the afore-mentioned type, consisting of an excess of lithium carbonate and an amount of lithium bromide sufficient to accelerate the reaction and operating within definitely limited reaction times and temperatures, di- or polybrominated derivatives of the steroid series may be converted into compounds possessing one or several double bonds while retaining at least one halogen in the molecule. The operation results in the liberation of one molecule of hydrobromic acid in the case of a dibrominated derivative, or of one or several molecules of hydrobromic acid in the case of a polybrominated compound and causes, depending upon the particular compound, the formation of one or several double bonds whereby, however, at least one of the bromine atoms is always retained in the molecule. In the same manner as described and claimed in the afore-mentioned, co-pending application, the method avoids the formation of any 4,6-diene in place of the desired 1,4-diene. Moreover, we found that, if the steroid derivative which is to be dehydrohalogenated possesses a bromine atom in 17-position, migration of the 16,17 double bond formed during the reaction toward the 14,15-position is avoided.

Of course, the di- or polybrominated steroids, which are dehydrobrominated according to the present disclosure, may carry, in addition to bromine atoms, various other substituents at the A, B, C, and D rings or at lateral chains thereof, particularly carbonyl or hydroxyl groups or derivatives of these groups that are readily converted into ketones or alcohols, such as acetals, ene-amines, carbonyl enol ethers and esters or ether-oxides which readily produce hydroxyl groups or cleavage. The process is equally applicable to compounds of the normal series (with rings A and B in cis-position) as well as to compounds of the allo series (with rings A and B in trans-position), and the steroids may be taken from the genin series, such as hecogenin, the sterol series and degradation products thereof such as androstanes and allopregnanes, but also from the series including biliary acids, pregnanes and etiocholanes, and obviously, all the above-mentioned substitution products of these compounds.

It is, therefore, the principal object of the present invention to furnish a practical method of converting, at excellent yields, 3,20-diketo pregnanes or di- or polyhalogenated 3-hydroxy 20-keto pregnanes of the general formula

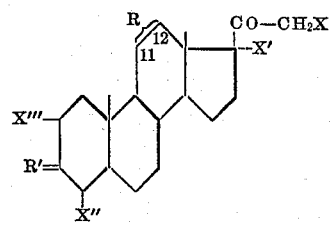

wherein R represent atoms or a group saturating the extra-nuclear bonds of the 11- or 12-carbon atom in the C ring, which atoms or group may be either hydrogen

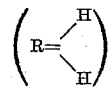

a secondary alcohol group

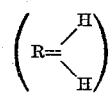

a keto group (R=O), or a simple derivative of these last two groups from which they can be readily regenerated; R' represents =O or

or a readily cleavable derivative of these two groups; and X, X', X" and X'" represent hydrogen or bromine, to the corresponding 21-bromo Δ16-pregnene 3,20-diones or 21-bromo 3-hydroxy 20-keto Δ16-pregnenes.

This and other objects and advantages of the present invention will appear more clearly from the following detailed description and the examples provided to further illustrate the disclosure.

Acetoxylation of these 21-bromo Δ16-pregnene 3,20-diones and 21-bromo 3-hydroxy 20-keto Δ16-pregnenes at the 21-position followed by hydrogenation of the double bond permits an easy and economic preparation of the corresponding 21-acetoxy pregnanes which, in turn, may be readily converted (by formation of the respective 4-halogenated 3-ketosteroids and dehydrohalogenation) to the corresponding 21-acetoxy Δ4-pregnene-dione. Because of the excellent yields obtained during the first dehydrobromination at the 16-17 position, desoxycorticosterone acetate

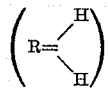

or 11-dehydrocorticosterone acetate (R=O), may be produced in a very economic manner, and the corresponding free hormones are obtained from the latter by simple saponification. It is also possible to take advantage of the presence of a 16,17 double bond to prepare, according to Plattner (Helv. Chim. Acta, 1948, 31, 2210) and Julian (J. Am. Chem. Soc. 1949, 71, 3575) the epoxide and to introduce a hydroxyl group in 17α-position. This method has scarcely been used in the past due to the low yield of the selective dehydrobromination, generally carried out with potassium acetate or heterocyclic or aromatic tertiary bases. Thus, compounds of the cortisone series, or, by previously substituting hydrogen for the bromine atom in 21-position, 17α-hydroxyprogesterone may be obtained.

The process makes it also possible to start from 2,4-dibrominated steroid derivatives and to produce the corresponding Δ¹-4-bromosteroids. Substitution of halogen by hydrogen produces the corresponding Δ¹-steroids, some of which have not been described in the past or have not been examined physiologically because of the past difficulties of preparing these products which constitute important starting materials for the production of 1-hydroxysteroids.

Finally, starting from a 2,4,17,21-tetrabrominated pregnane, it is possible to produce either the corresponding 4,21-dibromo Δ$^{1,16}$-pregnadiene or to prepare 21-bromo Δ$^{1,4,16}$-pregnatriene 3,20-dione and therefrom Δ$^{1,4,16}$-pregnatriene 3,20-dione.

Using the process according to the invention, it is possible, for example, to produce 4-bromo 17β-acetoxy Δ¹-etiocholen-3-one from 2,4-dibromo 17β-acetoxy etiocholen-3-one and to convert the first-named derivative into 17β-acetoxy Δ¹-etiocholen-3-one.

By an analogous method, it is possible, upon starting from 2,4-dibromo 17α-hydroxy 21-acetoxy pregnane 3,11,20-trione, to obtain 17α-hydroxy 21-acetoxy Δ¹-pregnene 3,11,20-trione which can be used, according to U.S. Patent 2,737,518, to produce 1-hydroxycortisone.

Finally, Δ$^{1,4,16}$-pregnatriene 3,20-dione prepared when starting from 2,4,17,21-tetrabromopregnane 3,20-dione, produces 19-norprogesterone, by means of cracking, saturation of the 16,17 double bond and reduction according to Birch.

These partial, selective dehydrohalogenations are preferably carried out at the 16,17- and 1,2-position. They open, as indicated above, an approach to either new products or to intermediate compounds which have been known in the past but were difficult to obtain.

The results set forth in the above-mentioned, copending application could have led to the conclusion that an excess of the reagent would completely dehydrobrominate di- or polyhalogenated steroids. However, as certain of the subsequent examples will indicate, the use of a lithium halide alone does not cause complete dehydrobromination, but results in the formation of Δ$^{14,15}$, Δ$^{16,17}$ conjugated dienes, in the same manner as it produces Δ$^{4,5}$, Δ$^{6,7}$ dienes from 2,4-dibrominated ketosteroids.

For the practical application of the process, the di- or polyhalogenated steroid is treated with a couple of lithium bromide-lithium carbonate in the presence of a disubstituted carboxylic acid amide, such as dimethylformamide and the time and temperature of the treatment are held within predetermined limits. Since the lithium carbonate which is used in excess is not soluble in the reaction medium, it must be kept in suspension by vigorous stirring in order to neutralize any trace of free hydracid in the medium. After precipitation with acidified water, which destroys the remaining excess of lithium carbonate, a partially dehydrohalogenated steroid is obtained which is usually pure after a single recrystallization. The temperatures used range between about 70° C. and 100° C., and the time of reaction is limited to a minimum which generally varies from 20 minutes to one hour. The yields are often close to 90% of the theoretical yield.

The optimum temperature and time of the reaction can be predetermined by checking the ultraviolet absorption spectrum of a small sample or the bromine content of the precipitated dehydrohalogenation product.

The following examples are presented to illustrate the present invention, but in no way to limit thereby the scope of the appended claims.

The melting points mentioned in the examples are instantaneous melting points determined by means of the heated block method.

EXAMPLE 1

Selective dehydrobromination at the 16,17-position of 17,21-dibromo 3α-acetoxy pregnan-20-one

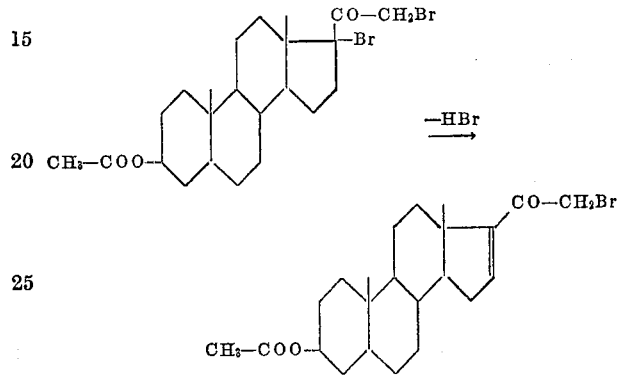

0.9 gr. of anhydrous lithium bromide is dissolved in 25 cc. of dimethylformamide, and 2 gr. of dry lithium carbonate are added. While the suspension is stirred, heated to 95° C. and a stream of nitrogen is passed through the mixture, 5 gr. of 17,21-dibromo 3α-acetoxy pregnan-20-one are added, which has a M.P. of 145° C., $[\alpha]_D^{20} = +22°$ (c.=1%, ethanol) and has been prepared according to the method described for the preparation of the β-isomer by Marker et al. (J. Am. Chem. Soc. 1942, 64, 213).

The suspension is maintained at 95° C. for 30 minutes and is poured into water containing a small amount of acetic acid to render the lithium carbonate soluble. The precipitate is filtered with suction, washed with water, dried and crystallized in acetone, resulting in 3.8 gr. of pure 21-bromo 3α-acetoxy Δ$^{16}$-pregnen-20-one, or a yield of 90%; M.P. =158–160° C. $[\alpha]_D = +60°$ (c.=1%, ethanol).

Analysis.—$C_{23}H_{33}O_3Br = 437.3$. — Calculated: 63.15% C, 7.6% H, 10.98% O, 18.27% Br. Found: 63.3% C, 7.6% H, 11.3% O, 18.0% Br.

This compound has not been previously described.

EXAMPLE 2

Selective dehydrobromination at the 16,17-position of 17,21-dibromo pregnane 3,20-dione

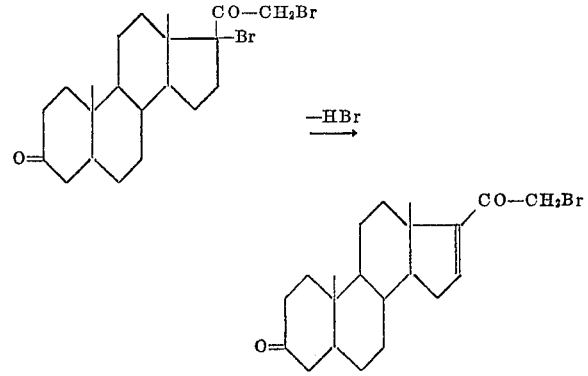

(a) USING THE LITHIUM BROMIDE-LITHIUM CARBONATE COUPLE

The process is carried out according to Example 1, using 100 cc. of dimethylformamide, 4 gr. of lithium bromide and 6 gr. of anhydrous lithium carbonate for 20 gr. of 17,21-dibromo pregnane 3,20-dione; M.P. 162° C., $[\alpha]_D^{20}=+6°$ (c.=1%, ethanol), the preparation of which has been described in Bull. Soc. Chim., France, 1956, pages 1454–1455, 16.3 gr. (or a yield of 98%) of 21-bromo $\Delta^{16}$-pregnene 3,20-dione are obtained. Recrystallization in acetone results in 15.4 gr. of the pure product; M.P.=188° C., $[\alpha]_D^{20}=+54°$ (c.=1%, ethanol). This product comprises 20% bromine (theoretically: 20.3%).

(b) USING LITHIUM BROMIDE ALONE

Process (a) is repeated, but in the absence of lithium carbonate. A crude product is obtained, at a yield of 84%, which melts below 100° C., $[\alpha]_D=+272°$ (c.=1%, ethanol). As indicated by the ultraviolet spectrum, most of starting material has been converted into dien-$\Delta^{14,16}$-20-one; $\lambda$ max. 309 m$\mu$ at $$E_{1\,cm.}^{1\%}=186$$

By means of recrystallization in acetone, pure 21-bromo $\Delta^{16}$-pregnene 3,20-dione is separated, identical with that obtained according to (a), but at a yield of only 7%.

EXAMPLE 3

Selective dehydrobromination at the 16,17-position of 17,21-dibromo 3α-hydroxy pregnane 11,20-dione

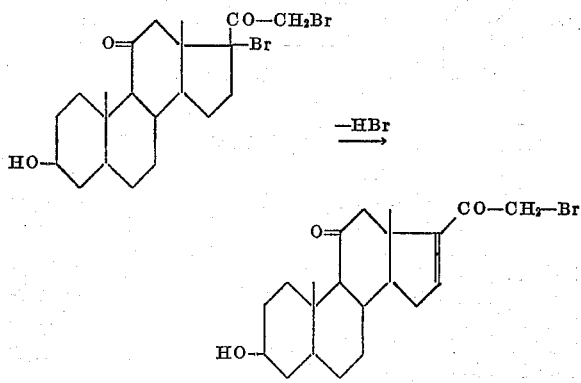

(a) PREPARATION OF 3α-HYDROXY 17,21-DIBROMO-PREGNANE 11,20-DIONE 100 gr. of 17,21-dibromo 3α-acetoxy pregnane 11,20-dione, M.P.=187.5° C., $[\alpha]_D^{20}=+22°$ (c.=1%, chloroform) the preparation of which has been described by Engels, J. Am. Chem. Soc., 77, 1064 (1955), are stirred into 300 cc. of absolute methanol containing 3 cc. of 66° Bé. pure sulfuric acid. The solution is refluxed for 4½ hours while continuously stirring. Upon cooling the resulting solution to about −10° C., the desired 3α-hydroxy 17,21-dibromopregnane 11,20-dione precipitates. It is separated, washed with iced methanol, and then pasted with very hot water in order to eliminate retained methanol. Filtering with suction and drying at 40° C. produces 86 gr. or a yield of 93% of the desired product; M.P.=190° C., $[\alpha]_D^{20}=0°+2°$ (c.=1%, chloroform).

Analysis.—$C_{21}H_{30}O_3Br_2$=490.29.—Calculated: 51.44% C, 6.17% H, 9.79% O, 32.6% Br. Found: 51.6% C, 6.1% H, 9.6% O, 32.8% Br.

This compound has not been previously described.

(b) DEHYDROBROMINATION, USING THE LITHIUM BROMIDE-LITHIUM CARBONATE COUPLE

Following the procedure of Example 1 and using 10 gr. of 3α-hydroxy 17,21-dibromo pregnane 11,20-dione prepared according to (a), 1.86 gr. of lithium bromide and 3 gr. of anhydrous lithium carbonate, 8.25 gr. (or a yield of 99%) of practically pure 21-bromo 3α-hydroxy $\Delta^{16}$-pregnene 11,20-dione, M.P.=223° C., are obtained. After recrystallization in acetone, the M.P. is 224° C., $[\alpha]_D^{20}=+58°$ (c.=1%, chloroform).

Analysis.—$C_{21}H_{29}O_3Br$=409.36.—Calculated: 61.61% C, 7.14% H, 19.52% Br. Found: 61.8% C, 7.2% H, 19.5% Br.

This compound has not been previously described.

EXAMPLE 4

Selective dehydrobromination at the 2-position of 2,4-dibromo 17β-acetoxy etiocholan-3-one

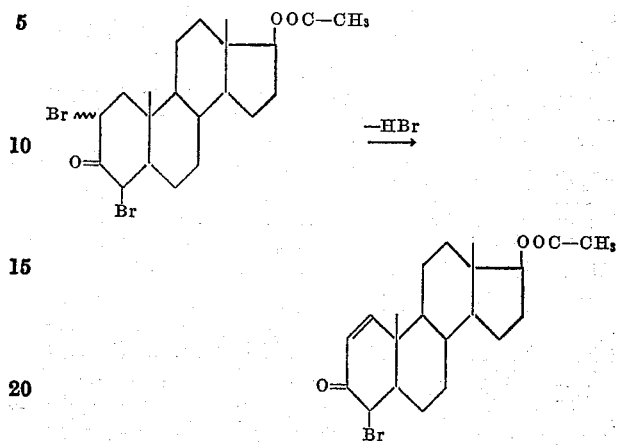

The starting compound is obtained according to the process described in U.S. Patent No. 2,768,189 of October 23, 1956. Moreover, details of the preparation are given in the afore-mentioned, co-pending application Ser. No. 627,113. The compound has the following characteristics: M.P.=256° C., $[\alpha]_D^{20}=+9°$ (c.=1%, chloroform).

Following the procedure of Example 1 and using 20 gr. of 2,4-dibromo 17β-acetoxy etiocholan 3-one, 3.52 gr. of anhydrous lithium bromide and 6 gr. of dry lithium carbonate, after a reaction time of 40 minutes, 11 gr. of recrystallized 4-bromo 17β-acetoxy $\Delta^1$-etiocholen-3-one or a yield of 65% are obtained; M.P.=207° C., $[\alpha]_D^{20}=169°\pm2°$ (c.=1%, chloroform). The product is soluble in alcohol, acetone, chloroform and benzene, difficultly soluble in ether, insoluble in water, diluted acids and alkalies.

Analysis.—$C_{21}H_{29}O_3Br$=409.36.—Calculated: 61.61% C, 7.14% H, 11.72% O, 19.52% Br. Found: 61.9% C, 7.2% H, 11.7% O, 19.1% Br. Ultraviolet spectrum: $\lambda$ max. 236 m$\mu$ at $\epsilon$=8480 (methanol).

This compound has not been previously described.

Another dehydrobromination by means of the same couple, but this time carried out at 150° C. for 1 hour, results in 17β-acetoxy $\Delta^{1,4}$-androstadien-3-one, at a yield of 95%, M.P.=153° C., $[\alpha]_D^{20}=+34°$ (c.=1%, ethanol).

Ultraviolet spectrum $\lambda$ max. 244 m$\mu$ at $\epsilon$=16,000 (ethanol).

EXAMPLE 5

Selective dehydrobromination at the 2-position of 2α,4β-dibromo 17α-hydroxy 21-acetoxy pregnane 3,11,20-trione

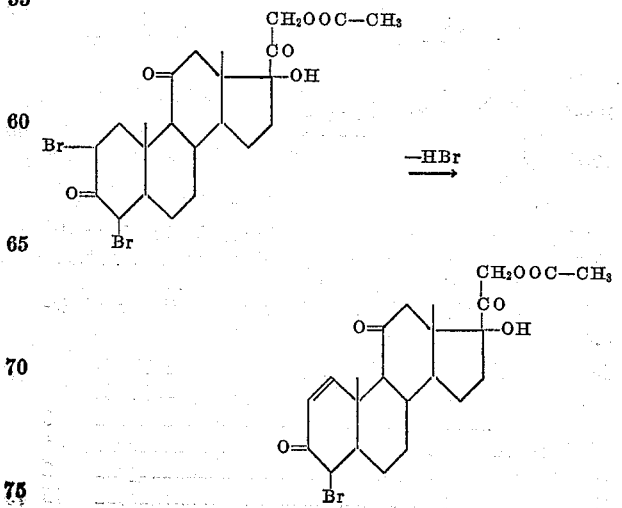

(a) USING THE LITHIUM BROMIDE-LITHIUM CARBONATE COUPLE

The process is carried out under the conditions of Example 1 using levorotatory 2α,4β-dibromo 17α-hydroxy 21-acetoxy pregnane 3,11,20-trione, $[\alpha]_D^{20}=-14°$ (c.=2%, tetrahydrofurane), obtained according to the process described in the co-pending application Ser. No. 577,208 of April 10, 1956, now Patent No. 2,888,472. The amounts of reactants used are:

| | |
|---|---|
| 2α,4β-dibromo 17α-hydroxy 21-acetoxy pregnane 3,11,20-trione | gr-- 25 |
| Lithium carbonate | gr-- 7 |
| Lithium bromide | gr-- 4.25 |
| Dimethylformamide | cc-- 100 |

The process results in 21.3 gr. or a yield of 99% of 4β-bromo 17α-hydroxy 21-acetoxy Δ¹-pregnene 3,11,20-trione, the bromine content of which is 16.9% (theory: 16.6%), $[\alpha]_D^{20}=+170°$ (c.=2%, tetrahydrofurane).

For purposes of analysis the product is recrystallized in acetone, resulting at first in 15 gr. of the pure product. Additional mounts can be recovered by concentrating the mother liquor. M.P.=272° C., $[\alpha]_D^{20}=+183\pm2°$ (c.=1%, tetrahydrofurane).

Ultraviolet spectrum: λ max. 229 mμ at ε=7,750 (ethanol).

Analysis.—$C_{23}H_{29}O_6Br$=481.38.—Calculated: 57.38% C, 6.07% H, 19.94% O, 16.60% Br. Found: 57.4% C, 6.1% H, 19.9% O, 16.6% Br.

This compound has not been previously described.

Heated to 95° C. for 15 hours under the conditions of Example 1, but using a lithium bromide-lithium carbonate couple, this previously described Δ¹-dehydrocortisone acetate is obtained at a yield of 80%.

(b) USING LITHIUM BROMIDE ALONE

Operating under the conditions of Example 1, but in the absence of lithium carbonate, a colored crude product is obtained at a yield of 80%. The M.P. is 150° C. The product comprises 12% of bromine and the rotatory power thereof is $[\alpha]_D^{20}=+153°$ (c.=1%, tetrahydrofurane).

Fractional crystallization fails to isolate any pure compound. This product is a mixture of 4β-bromo 17α-hydroxy 21-acetoxy Δ¹-pregnene 3,11,20-trione, 17α-hydroxy 21-acetoxy Δ¹,⁴-pregnadiene 3,11,20-trione and 17α-hydroxy 21-acetoxy Δ⁴,⁶-pregnadiene 3,11,20-trione.

The ultraviolet spectrum shows a λ max. 238 mμ at $$E_{1\,cm.}^{1\%} = 164$$

EXAMPLE 6

*Selective dehydrobromination of 2α,4β,21-tribromo 17α-hydroxy pregnane 3,11,20-trione*

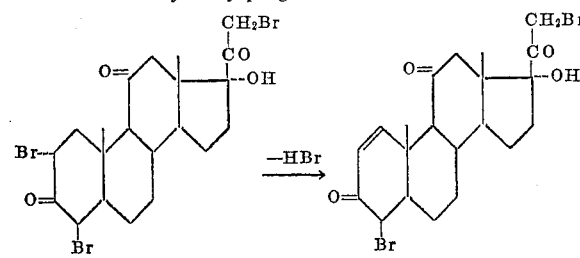

The preparation of the starting material has been described in the co-pending application Ser. No. 577,321 of April 10, 1956, now Patent No. 2,888,473.

The process is carried out under the conditions of Example 1, using the following reactants:

| | |
|---|---|
| 2α,4β,21-tribromo 17α-hydroxy pregnane 3,11,20-trione (M.P.=230°, $[\alpha]_D^{20}=-4°$) (c.=0.5%, acetone) | gr-- 3 |
| Lithium bromide | gr-- 0.45 |
| Lithium carbonate | gr-- 2 |
| Dimethylformamide | cc-- 15 |

The process results in 2.5 gr. (or a yield of 97%) of 4β,21-dibromo 17α-hydroxy Δ¹-pregnene 3,11,20-trione, M.P.=130° C., $[\alpha]_D^{20}=+162°$ (c.=1%, acetone). This product, having 29.5% Br is sufficiently pure to be used directly in the preparation of 17α,21-dihydroxy Δ¹-pregnene 3,11,20-trione 21-acetate by means of acetoxylation at the 21-position, followed by substituting the bromine at the 4-position by hydrogen under the influence of zinc in acetic acid as will be described in detail further below.

4,21-dibromo 17α-hydroxy Δ¹-pregnene 3,11,20-trione may be obtained by treating under the same conditions 2β,4β,21-tribromo 17α-hydroxy pregnane 3,11,20-trione, M.P.=230° C., $[\alpha]_D^{20}=+80°$ (c.=0.5%, acetone) described in the co-pending application Ser. No. 577,321 of April 10, 1956.

EXAMPLE 7

*Selective dehydrobromination of 2α,4β,17α,21-tetrabromopregnane 3,20-dione*

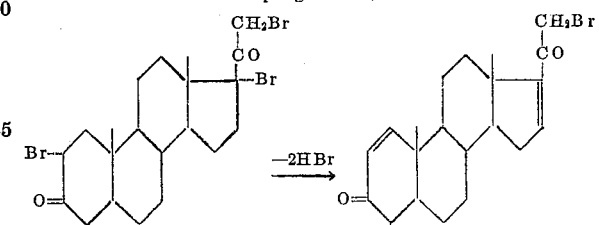

(a) PREPARATION OF THE STARTING PRODUCT 10 gr. of 17,21-dibromo pregnane 3,20-dione, M.P.=162–165° C., the preparation of which has been described in Bull. Soc. Chim., France, 1956, pages 1454–1455, are dissolved in 70 cc. of anhydrous dioxane at 20° C. After starting the reaction with a very small amount of bromine, 7 gr. thereof are added to the solution while stirring. Absorption is instantaneous. While the halogen is introduced, the temperature rises to 35° C. The solution is poured into water and a colorless oil is formed which gradually changes into crystalline solids that are filtered with suction and pasted with a mixture consisting of equal parts of methanol and isopropyl ether. After filtering with suction, the product is washed with isopropyl ether. 4.65 gr. (or a yield of 35%) of 2α,4β,17α,21-tetrabromopregnane 3,20-dione, M.P.=230° are obtained, whose melting point is not changed after recrystallization, $[\alpha]_D=-50°\pm2$ (c.=1%, dioxane).

Analysis.—$C_{21}H_{28}O_2Br_4$=632.11.—Calculated: 39.90% C, 4.47% H, 50.57% Br. Found: 40.2% C, 4.7% H, 50.2% Br.

This compound has not been previously described.

Upon treating the mother liquor with zinc in the presence of acetic acid, pregnane 3,20-dione, M.P.=119° C. is obtained at a yield of 30%.

(b) SELECTIVE DEHYDROBROMINATION AT THE 2- AND 16-POSITIONS

Operating under the conditions of Example 1, the following reactants are used:

| | Gr. |
|---|---|
| 2α,4β,17α,21-tetrabromo pregnane 3,20-dione (prepared according to (a)) | 10 |
| Lithium bromide | 2 |
| Anhydrous lithium carbonate | 3 |

The crude product is isolated as previously described and yields, after recrystallization in ethanol, 4.45 gr. of pure 4β,21-dibromo Δ¹,¹⁶-pregnadiene 3,20-dione, M.P.=181° C., $[\alpha]_D^{20}=+169°$ (c.=1%, dioxane).

Analysis.—$C_{21}H_{28}O_2Br_2$=470.27.—Calculated: 53.4% C, 5.3% H, 33.9% Br. Found: 53.9% C, 5.6% H, 33.7% Br.

This compound has not been previously described.

Heating in acetone in the presence of sodium iodide and precipitation in water result in 4β-bromo 21-iodo Δ¹,¹⁶- pregnadiene 3,20-dione which, upon treatment with sodium bisulfite, changes into 4β-bromo Δ¹,¹⁶-pregnadiene 3,20-dione, M.P.=230° C. $[\alpha]_D^{20}=+200°$ C. (c.=0.5%, dioxane). The compound contains 20.1% bromine (theoretically 20.4%). Subjected to a further dehydrobromination process as employed in connection with compounds of the steroid series, this compound is converted into Δ¹,⁴,¹⁶-pregnatriene 3,20-dione, which is identical with the product described by Rubin, Wishinsky and Franca Bompard, J. Am. Chem. Soc., 73, 2338 (1951), and is capable of yielding nor-progesterone by means of cracking, subsequent hydrogenation of the 16,17 double bond and reduction according to Birch. The foregoing reactions may be illustrated as follows:

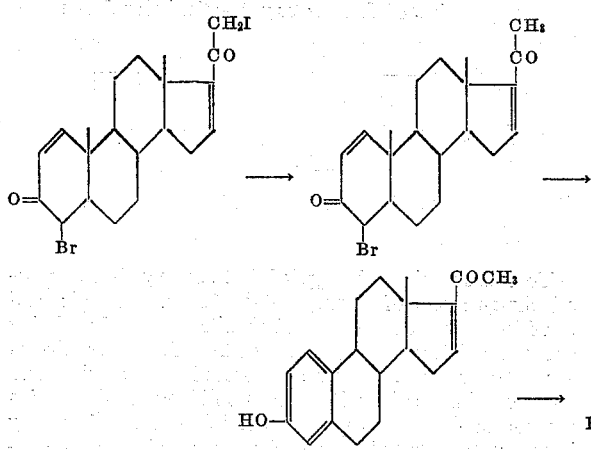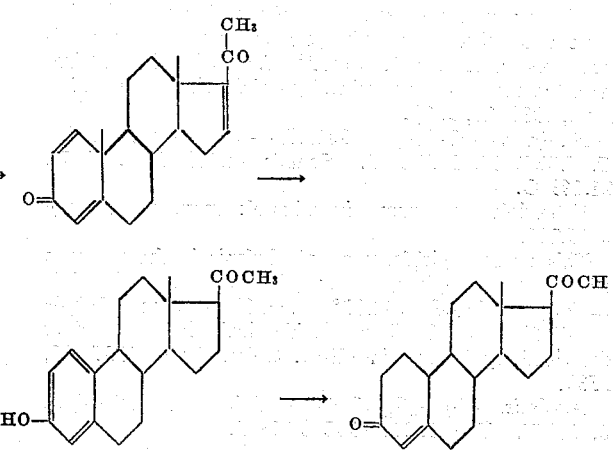

The subsequent examples illustrate the utilization of the intermediate compounds obtained according to the herein-claimed process by converting them into derivatives exhibiting hormone activity.

EXAMPLE 8

*Conversion of 21-bromo 3α-hydroxy Δ¹⁶-pregnene 11,20-dione into 11-dehydrocorticosterone (21-acetoxy Δ⁴-pregnene 3,11,20-trione) acetate*

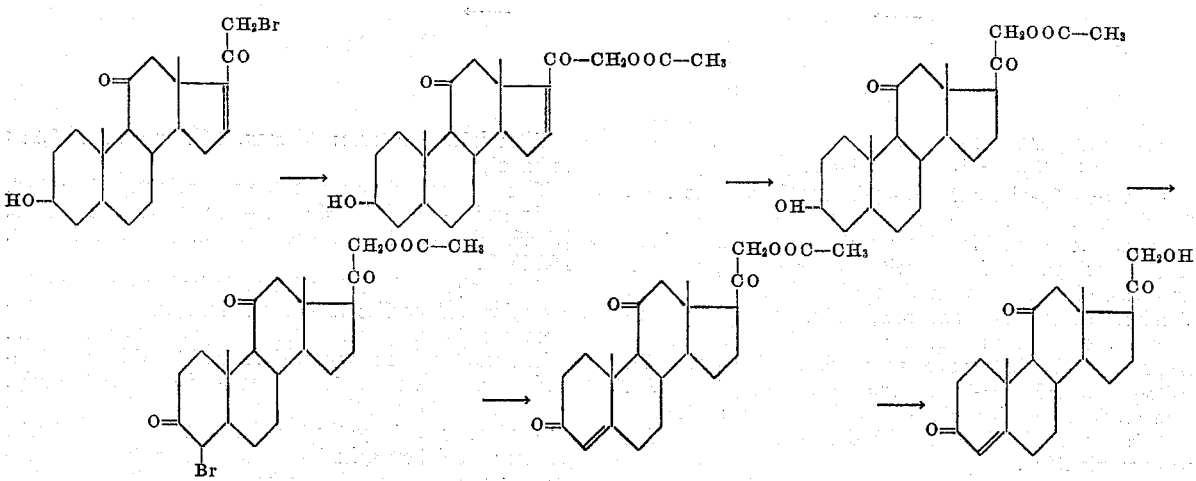

(a) PREPARATION OF 3α-HYDROXY 21-ACETOXY Δ¹⁶-PREGNENE 11,20-DIONE 10 gr. of 21-bromo 3α-hydroxy Δ¹⁶-pregnene 11,20-dione, obtained according to Example 3, are treated for 15 minutes with 5 gr. of sodium iodide in acetone at 20° C. The resulting sodium bromide is filtered off, 5 gr. of potassium acetate are added to the acetone solution which is then heated to boiling for 1 hour under an atmosphere of nitrogen. The solution is cooled, poured into water, and the resulting precipitate is filtered with suction, washed with water and dried. After recrystallization in acetone, 8.3 gr. (or a yield of 87%) of pure 3α-hydroxy 21-acetoxy Δ¹⁶-pregnene 11,20-dione, M.P.=202° C., $[\alpha]_D^{20}=+74°$ (c.=1%, acetone) are obtained.

*Analysis.*—$C_{23}H_{32}O_5$=388.49.—Calculated: 71.1% C, 8.3% H, 20.59% O. Found: 71.2% C, 8.3% H, 20.8% O.

This compound has not been previously described.

(b) PREPARATION OF 3α-HYDROXY 21-ACETOXY PREGNANE 11,20-DIONE 10 gr. of 3α-hydroxy 21-acetoxy Δ¹⁶-pregnene 11,20-dione obtained according to (a) and 100 cc. of dimethylformamide are entered into a hydrogenizing apparatus. Hydrogen is applied at room temperature and normal pressure in presence of palladium on charcoal until 683 cc. of hydrogen have been taken up which requires approximately 20 minutes. The palladium on charcoal is filtered off and washed with dimethylformamide. The filtrate together with the wash water is poured into water. After standing overnight, the resulting precipitate is filtered with suction, producing 8 gr. of 3α-hydroxy 21-acetoxy pregnane 11,20-dione, M.P.=138° C., $[\alpha]_D^{20}=+107°$ (c.=1%, acetone). This product is identical with the compound described by Reichstein (Helv. Chim. Acta, 1944, 27, 1287).

(c) PREPARATION OF 4-BROMO 21-ACETOXY PREGNANE 3,11,20-TRIONE

This compound is obtained by means of oxidizing 3α-hydroxy 21-acetoxy pregnane 11,20-dione and brominating the resulting 21-acetoxy pregnane 3,11,20-trione by means of N-bromosuccinimide in the presence of an oxidizable alcohol according to the process described in U.S. Patent No. 2,768,189 of October 23, 1956. The yield is 70%, M.P.=226° C., $[\alpha]_D^{20}=+124°$ (c.=1%, chloroform).

Analysis.—$C_{23}H_{31}O_5Br=467.5$.—Calculated: 59.08% C, 6.68% H, 17.11% O, 17.09% Br. Found: 58.9% C, 6.7% H, 17.0% O, 17.2% Br.

This compound has been described by Reichstein (Helv. Chim. Acta, 1943, 26, 747).

(d) PREPARATION OF DEHYDROCORTICOSTERONE 21-ACETATE

Dehydrobromination of 4-bromo 21-acetoxy pregnane 3,11,20-trione according to one of the processes generally used in steroid chemistry for introducing the 4,5 double bond (for example, by means of forming a semicarbazone and subsequent hydrolysis produces dehydrocorticosterone acetate (M.P.=179° C.) which is identical with the compound described by Reichstein (Helv. Chim. Acta, 1937, 20, 953).

Analysis. — $C_{23}H_{30}O_5=386.47$. — Calculated: 71.47% C, 7.82% H, 20.7% O. Found: 71.6% C, 7.8% H, 21.1% O.

Ultraviolet spectrum in ethanol: max. at 237 mµ =15,200.

This product yields, upon alcoholysis in the presence of sodium ethylate, 11-dehydrocorticosterone, M.P. =179° C., $[\alpha]_D^{20}=+222°$ (c.=1%, acetone), $[\alpha]_D^{20}$ =+238° (c.=1%, dioxane), identical with the product described by Reichstein (Helv. Chim. Acta., 1937, 20, 953).

Analysis.—$C_{21}H_{28}O_4=344.43$.—Calculated: 73.22% C, 8.19% H. Found: 73.1% C. 8.1% H.

EXAMPLE 9

Preparation of 17α-hydroxy 21-acetoxy Δ¹-pregnene 3,11,20-trione

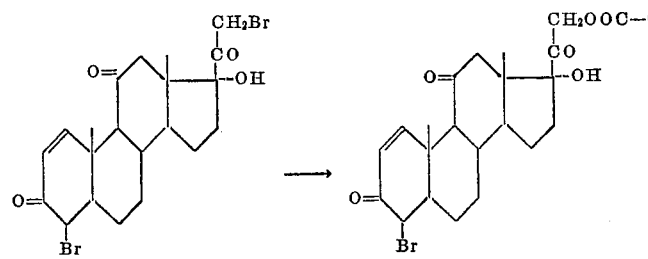

(a) PREPARATION OF 4-BROMO 17α-HYDROXY 21-ACETOXY Δ¹-PREGNENE 3,11,20-TRIONE 1 gr. of 4,21-dibromo 17α-hydroxy Δ¹-pregnene 3,11, 20-trione, obtained according to Example 6, is acetoxylated at the 21-position by reacting first with sodium iodide (0.5 gr.) and then with potassium acetate (0.5 gr.) according to the method described in Example 8(a). Precipitation in water and recrystallization in dimethylformamide produces 4-bromo 17α-hydroxy 21-acetoxy Δ¹-pregnene 3,11,20-trione at a yield of 30%, M.P. =264° C., $[\alpha]_D^{20}=+178°$ (c.=2%, tetrahydrofuran). The product contains 16.5% bromine (theory: 16.6%).

This product is identical with that obtained according to Example 5(a).

(b) DEBROMINATION OF 4-BROMO 17α-HYDROXY 21-ACETOXY Δ¹-PREGNENE 3,11,20-TRIONE 10 gr. of 4β-bromo 17α-hydroxy 21-acetoxy Δ¹-pregnene 3,11,20-trione obtained according to (a) are suspended in 125 cc. of acetic acid and 125 cc. of acetone. 10 gr. of zinc powder are introduced while stirring and maintaining a temperature of 20° C. Dissolution takes place. After standing for one hour at 20° C., the zinc is separated, washed with acetic acid, and the combined acetic liquids are poured into water. The precipitate produced thereby is filtered with suction, washed with water and dried at 50° C. It weighs 7.5 gr., M.P. =240° C. Recrystallization in acetone results in 6.75 gr. of pure 17α-hydroxy 21-acetoxy Δ¹-pregnene 3,11,20-trione, M.P.=245° C., $[\alpha]_D^{20}=+138°$ (c.=1%, acetone).

Ultraviolet spectrum: λ max. 225 mµ at ε=8,850 (ethanol).

Analysis.—$C_{23}H_{30}O_6=402.47$.—Calculated: 68.63% C, 7.51% H, 23.85% O. Found: 68.6% C, 7.4% H, 24.1% O.

This product is identical with the compound described by Mattox and Kendall (J. Biol. Chem., 1951, 188, 287).

EXAMPLE 10

Preparation of 17β-acetoxy Δ¹-etiocholen-3-one

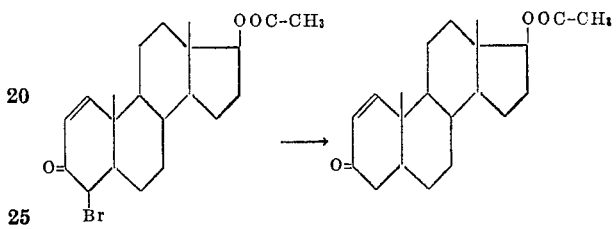

To a suspension of 1 gr. of 17β-acetoxy 4-bromo Δ¹-etiocholen-3-one of Example 4 in 10 cc. of acetic acid is added, 1 gr. of zinc powder while constantly stirring and maintaining a temperature of 20° C. After stirring for another hour, the zinc is filtered with suction and washed with acetic acid. The combined acetic liquids are poured into water and the precipitate formed thereby is separated, washed with water and dried, and then recrystallized in isopropylic ether, resulting 0.65 gr. of 17β-acetoxy Δ¹ - etiocholen - 3 - one, M.P=147° C., $[\alpha]_D^{20}$ =+125° (c.=1%, ethanol).

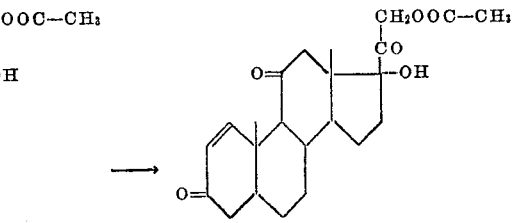

Ultraviolet spectrum: λ max. 232 mµ at ε=9,330 (ethanol).

This compound has not been previously described.
Analysis.—$C_{21}H_{30}O_3=330.45$.—Calculated: 76.32% C, 9.15% H, 14.52% O. Found: 76.2% C, 9.2% H, 14.7% O.

Obviously, the invention is not limited to the foregoing examples and applies to other steroid compounds aside from the di- or polybrominated derivatives mentioned.

The ratio between the constituents of the lithium halide-lithium carbonate couple may vary within a wide range. Any excess of the latter is limited only by the consideration of costs and by the requirement that the mixture permit an efficient agitation. In order to assure a satisfactory reaction speed, the amount of lithium halide present should be within the limits of 0.1 mol to 1 mol of lithium halide per mol of di- or polybrominated ketosteroid.

The preparation of the di- or polybrominated derivatives used as starting materials has been mentioned only if the compound has not been previously described.

We claim:

1. In the process of preparing compounds of the keto steroid series having at least one double bond and at least one bromine atom per molecule from starting materials selected from the group consisting of 17,21-dibromo-3α- acetoxy pregnan-20-one; 17,21-dibromo pregnane-3,20-dione; 17,21-dibromo-3α-hydroxy pregnane-11,20-dione; 2α,4β-dibromo-17α-hydroxy-21-acetoxy pregnane-3,11,20-trione; 2α,4β,21-tribromo-17α-hydroxy pregnane-3,11,20-trione; and 2α,4β,17α,21-tetrabromo pregnane-3,20-dione, the steps which comprise adding an excess of lithium carbonate to dimethyl formamide, stirring the mixture while passing a stream of nitrogen therethrough, adding one of said starting materials, heating the mixture to a temperature between about 70° C. and 100° C. for 20 minutes to one hour, while stirring is continued and nitrogen is passed through the reaction mixture, cooling, pouring the reaction mixture into water acidified with acetic acid, and separating the precipitated product.

2. The method according to claim 1, wherein a lithium carbonate-lithium halide reaction couple is formed by adding said excess of lithium carbonate and a lithium halide taken from the group consisting of lithium-chloride, -bromide and -iodide to said solvent, whereby an amount of said lithium halide is used which represents 0.1 to 1 mol equivalent of said subsequently added starting material.

3. The method of preparing, according to claim 1, 21-bromo-Δ16-pregnene 3,20-dione from 17α,21-dibromo pregnane 3,20-dione.

4. The method of preparing, according to claim 1, 4β,21-dibromo-Δ1,16-pregnadiene 3,20-dione from 2α,4β,17α,21-tetrabromo pregnane 3,20-dione.

5. 21-bromo 3α-hydroxy-Δ16-pregnene 11,20-dione.

6. 4β,21-dibromo-Δ1,16-pregnadiene 3,20-dione.

7. As a new compound, 4β-bromo-Δ1,16-pregnadiene 3,20-dione.

8. The process of producing 21-bromo-3α-acetoxy-Δ16-pregnen-20-one, said process comprising adding an excess of lithium carbonate to dimethyl formamide, stirring the mixture, passing a stream of nitrogen therethrough, adding 17α,21-dibromo-3α-acetoxy pregnan-20-one thereto, heating the mixture at a temperature between about 70° C. and about 100° C. for a period of time between about 20 minutes to one hour while continuing stirring and passing nitrogen therethrough, cooling the reaction mixture, pouring said mixture into water acidified by the addition of acetic acid, and separating the precipitated 21-bromo-3α-acetoxy-Δ16-pregnen-20-one.

9. The process of producing 21-bromo-3α-hydroxy-Δ16-pregnene-11,20-dione, said process comprising adding an excess of lithium carbonate to dimethyl formamide, stirring the mixture, passing a stream of nitrogen therethrough, adding 17α-21-dibromo-3α-hydroxy pregnane-11,20-dione thereto, heating the mixture at a temperature between about 70° C. and about 100° C. for a period of time between about 20 minutes to one hour while continuing stirring and passing nitrogen therethrough, cooling the reaction mixture, pouring said mixture into water acidified by the addition of acetic acid, and separating the precipitated 21-bromo-3α-hydroxy-Δ16-pregnene-11,20-dione.

10. The process of producing 4β-bromo-17α-hydroxy-21-acetoxy-Δ1-pregnene-3,11,20-trione, said process comprising adding an excess of lithium carbonate to dimethyl formamide, stirring the mixture, passing a stream of nitrogen therethrough, adding 2α,4β-dibromo-17α-hydroxy-21-acetoxy pregnane-3,11,20-trione thereto, heating the mixture at a temperature between about 70° C. and about 100° C. for a period of time between about 20 minutes to one hour while continuing stirring and passing nitrogen therethrough, cooling the reaction mixture, pouring said mixture into water acidified by the addition of acetic acid, and separating the precipitated 4β-bromo-17α-hydroxy-21-acetoxy-Δ1-pregnene-3,11,20-trione.

11. The process of producing 4β,21-dibromo-17α-hydroxy-Δ1-pregnene-3,11,20-trione, said process comprising adding an excess of lithium carbonate to dimethyl formamide, stirring the mixture, passing a stream of nitrogen therethrough, adding 2α,4β,21-tribromo-17α-hydroxy pregnane-3,11,20-trione thereto, heating the mixture at a temperature between about 70° C. and about 100° C. for a period of time between about 20 minutes to one hour while continuing stirring and passing nitrogen therethrough, cooling the reaction mixture, pouring said mixture into water acidified by the addition of acetic acid, and separating the precipitated 4β,21-dibromo-17α-hydroxy-Δ1-pregnene-3,11,20-trione.

References Cited in the file of this patent

UNITED STATES PATENTS

| | | |
|---|---|---|
| 2,260,328 | Miescher et al. | Oct. 28, 1941 |
| 2,280,828 | Inhoffen | Apr. 28, 1942 |
| 2,359,772 | Marker et al. | Oct. 10, 1944 |
| 2,369,065 | Marker et al. | Feb. 6, 1945 |
| 2,667,498 | Julian et al. | Jan. 26, 1954 |
| 2,671,794 | Julian | Mar. 9, 1954 |
| 2,683,723 | Hogg et al. | July 13, 1954 |
| 2,684,963 | Schock et al. | July 27, 1954 |
| 2,691,013 | Moffett | Oct. 5, 1954 |
| 2,768,189 | Nomine et al. | Oct. 23, 1956 |
| 2,783,226 | Gould et al. | Feb. 26, 1957 |
| 2,846,456 | Sarett | Aug. 5, 1958 |
| 2,877,161 | Sebek et al. | Mar. 10, 1959 |
| 2,915,535 | Warnant | Dec. 1, 1959 |

OTHER REFERENCES

Engel: J. Am. Chem. Soc., vol. 77 (February 20, 1955), pp. 1064–5.